Figure 1:
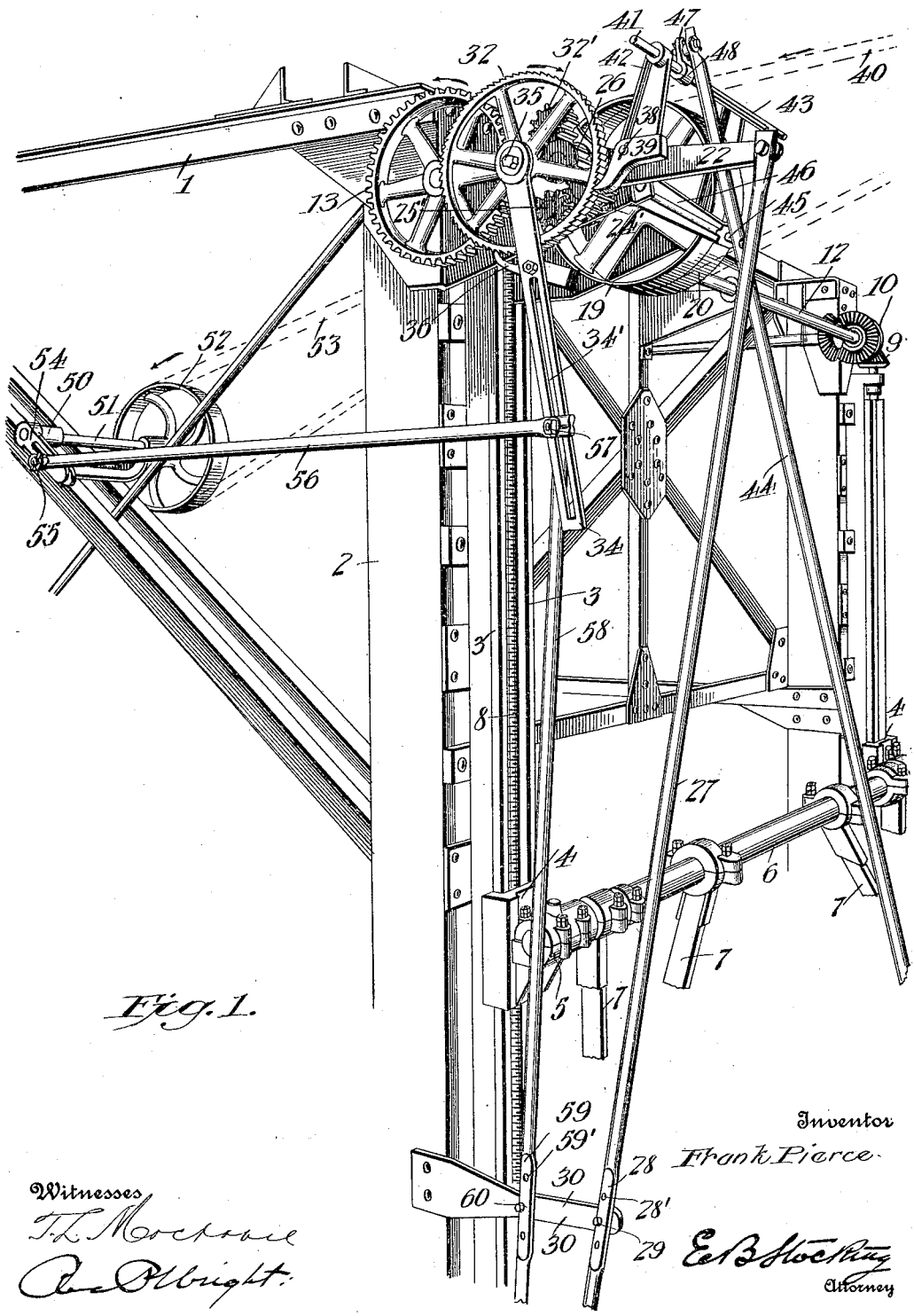

F. PIERCE.
FEED DRIVING MECHANISM.
APPLICATION FILED OCT. 13, 1913.

1,138,970.

Patented May 11, 1915.
3 SHEETS—SHEET 1.

Witnesses
Inventor
Frank Pierce.
Attorney

F. PIERCE.
FEED DRIVING MECHANISM.
APPLICATION FILED OCT. 13, 1913.

1,138,970.

Patented May 11, 1915.
3 SHEETS—SHEET 3.

Witnesses

Inventor
Frank Pierce,
By E. B. Stocking
Attorney

UNITED STATES PATENT OFFICE.

FRANK PIERCE, OF RUTLAND, VERMONT, ASSIGNOR TO LINCOLN IRON WORKS, OF RUTLAND, VERMONT, A CORPORATION OF VERMONT.

FEED DRIVING MECHANISM.

1,138,970.     Specification of Letters Patent.     Patented May 11, 1915.

Application filed October 13, 1913. Serial No. 794,947.

*To all whom it may concern:*

Be it known that I, FRANK PIERCE, a citizen of the United States, residing at Rutland, in the county of Rutland and State of Vermont, have invented certain new and useful Improvements in Feed Driving Mechanism, of which the following is a specification, reference being had therein to the accompanying drawing.

This invention relates to certain new and useful improvements in feed driving mechanism especially adapted to be used in connection with gang sawing machines, the object being to provide a sawing machine with novel means for feeding the gang saw frame to the stone being cut in connection with novel means for advancing the gang saw frame to the stone or for winding up the gang saw frame; the driving mechanism being so constructed that the gang saw frame can be advanced to the stone at a high rate of speed and by shifting a lever, the feed mechanism, which is provided with means for adjusting the feed thereof, will be thrown into operation so that the frame will be moved downwardly continuously in order to advance the saws as the cuts are made.

Another object of the invention is to provide a feed driving mechanism which is so constructed that it is impossible to throw in the wind-up gears when the feed gear is in mesh, thereby overcoming the difficulties now existing with stone sawing machines, in order to avoid break-downs caused by careless operators in shifting the feed mechanism to the wind-up, without first throwing the feed mechanism out of operation.

Another and further object of the invention is to provide driving gears by means of which, the gang saw frame can be quickly moved up and down in order to advance the gang quickly to the stone being cut or to withdraw the same therefrom, after the stone has been completely cut.

Another object of the invention is to provide a driving connection in which the long drive belt of stone sawing machines now in use is dispensed with as the crank feed shaft is driven by a counter belt mounted on a counter shaft which is driven directly, by a driving belt; said counter shaft carrying a tight and loose pulley, the loose pulley carrying the counter belt and the counter shaft being provided with a driving gear meshing with gears for winding the gang frame up or down; the arrangement of these gears being such that, when any one of the gears is in operation, the other gears are thrown out of operation.

Other and further objects and advantages of the invention will be hereinafter set forth and the novel features thereof defined by the appended claims.

Figure 2:
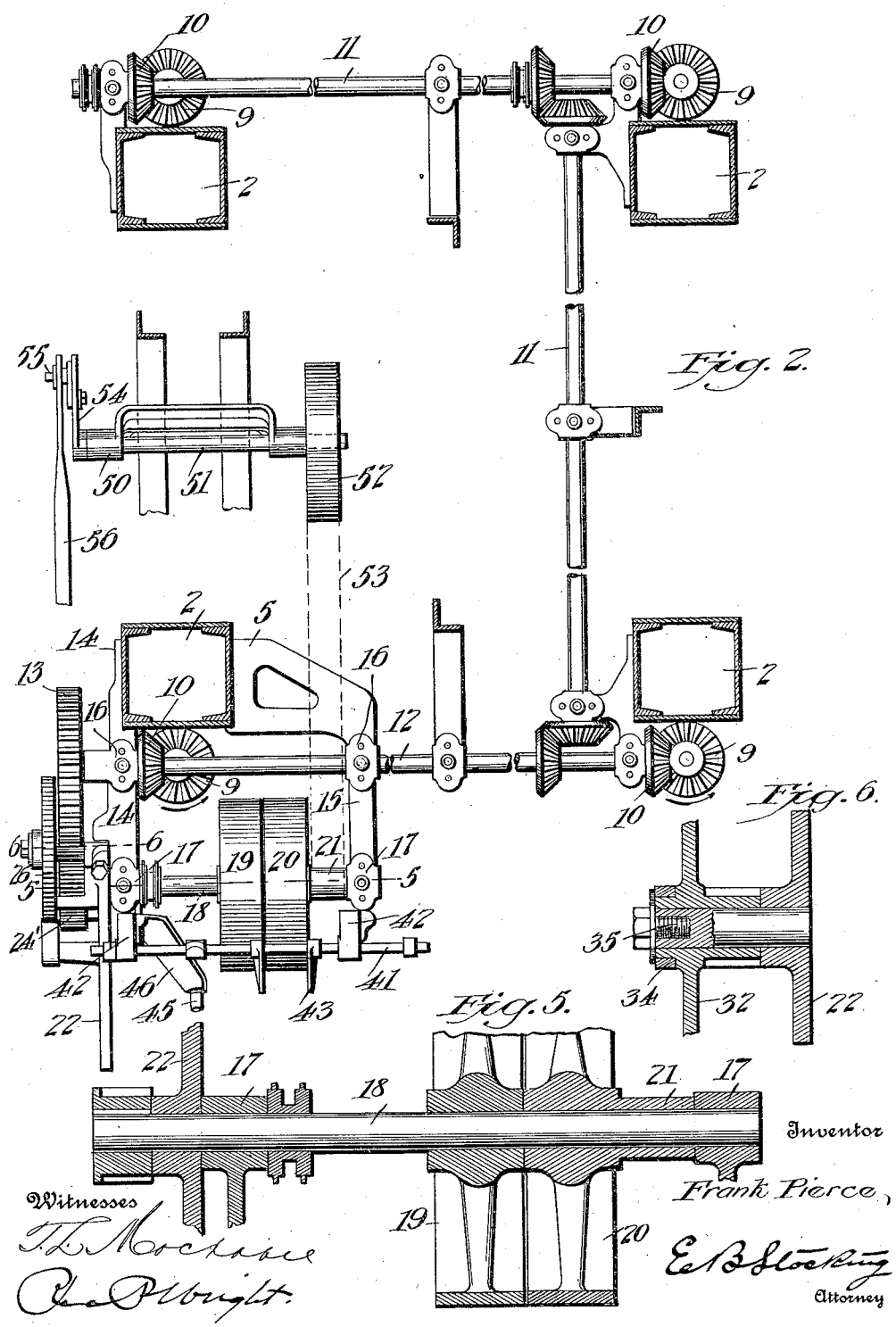
Figure 3:
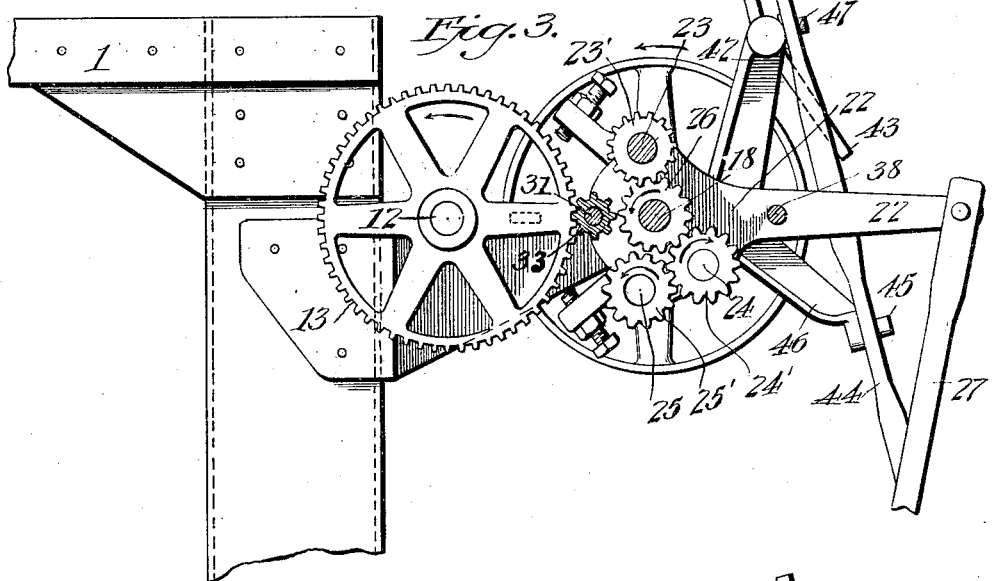
Figure 4:
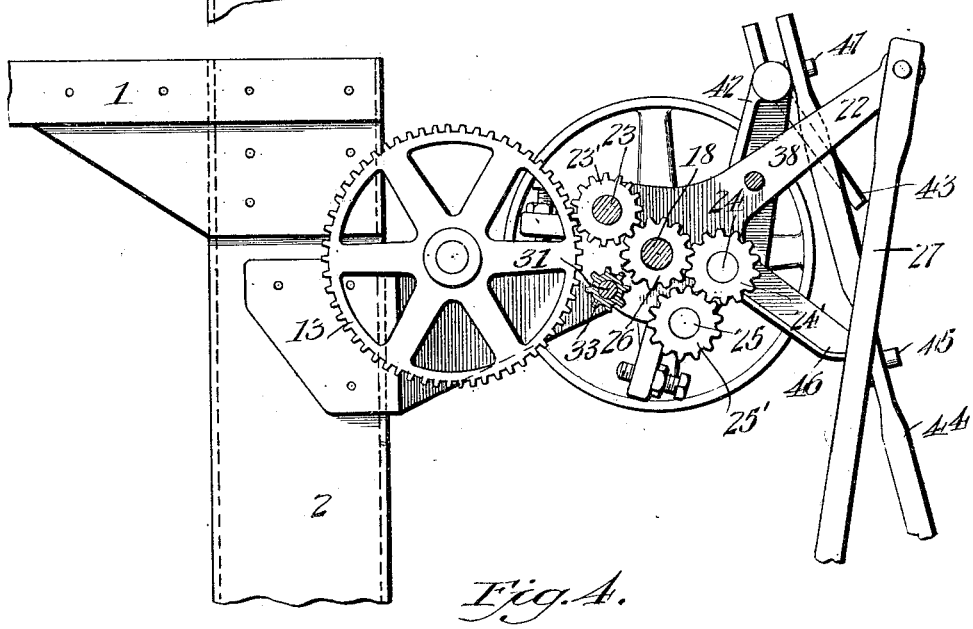

In the drawings—Figure 1, is a perspective of my improved construction of driving mechanism for gang sawing machines, showing the application of the same to a gang saw of the ordinary construction now in use; Fig. 2, is a horizontal section showing the feed shafts and the driving mechanism connected thereto; Fig. 3, is a side elevation partly in section, showing the feed gear in mesh with the feed shafts of the machine for advancing the gang saw as the cuts are made thereby; Fig. 4, is a similar view showing the feed gear thrown out of mesh and a weak feed gear thrown into mesh so as to advance the gang saw frame in position to operate upon the stone to be cut; Fig. 5, is a section taken on the line 5—5 of Fig. 2; and Fig. 6, is a section taken on the line 6—6 of Fig. 2.

Like numerals of reference refer to like parts in the several figures of the drawings.

In the drawing, 1 indicates the main frame of a sawing machine provided with corner posts 2 having vertical guide-ways 3 on which are slidably mounted guide members 4 provided with bearings 5 in which are mounted cross shafts 6 provided with suspension rods 7 for suspending the gang saw frame not shown.

The frame is preferably rectangular in shape and the cross rods 6 are arranged in the companion bearings of the guide members 4, as clearly shown in Fig. 1, in order to support the gang saw frame at each end so that the same can be readily reciprocated by mechanism, not shown.

The above description is given so that the operation of my improved construction of driving mechanism to a gang saw provided with a vertically adjustable gang saw frame can be readily understood.

Arranged at each corner post adjacent the guideways 3 is a feed screw shaft 8 which extends through nut bearings, not shown, in the guide members 4, and each feed screw shaft is provided with a beveled gear 9 at its upper end which is driven by bevel gears 10 carried respectively by counter-shafts 11 and a driving shaft 12. This construction of feed driving mechanism is common in gang saw machines now in use. By this construction of driving means, the feed screw shafts are rotated in unison when the driving gear 13 fixed on one end of the driving shaft 12 is rotated through my improved construction of driving mechanism, which will be later described.

Connected to one of the corner posts, is a pair of hangers 14 and 15 which are provided with bearings 16 for the driving shaft 12; the other end of which is supported by suitable bearings, as clearly shown, carried by the frame of the sawing machine. These hangers 14 and 15 extend outwardly beyond the main frame of the machine and are provided with bearings 17 at their ends in which is mounted a counter shaft 18 carrying tight and loose pulleys 19 and 20; the hub of the loose pulley 20 being provided with an extended sleeve 21 forming a pulley for the purpose which will be hereinafter described.

The counter shaft 18 extends outwardly beyond the hanger 14 and on which is pivotally mounted a banjo arm 22 provided with stud shafts 23, 24 and 25; the stud shaft 23 being provided with a pinion 23' which meshes with a drive pinion 26 fixed on the counter shaft 18 as clearly shown in Figs. 3 and 4.

The drive pinion 26 meshes with an intermediate pinion 24' which in turn meshes with a wind-up pinion 25' mounted upon the stud 25 as clearly shown; said banjo arm swinging upon the counter shaft 18 as its fulcrum, whereby either the pinions 23' or 25' can be thrown into mesh with the driving gear 13 by raising and lowering the banjo arm. The end of the banjo arm 22 has an adjusting rod 27 pivotally connected thereto, which is provided with a flattened portion 28 having a series of openings 28' to receive a stud pin 29 carried by a bracket 30 secured to the adjacent corner post by means of which, the banjo arm can be swung upon its pivot and held in its adjusted position.

The banjo arm 22 is provided with a stud shaft 31 between the drive pinion and the periphery of the driving gear 13 on which is mounted a ratchet wheel 32; the hub portion thereof being provided with a laterally extending pinion 33 surrounding the stud shaft 31 and meshing with the driving gear 13, whereby the driving gear 13 will be rotated when the ratchet wheel is rotated through the medium of the pinion 33 so as to rotate the driving shaft 12 in a direction to advance the gang saw frame in a downward direction so as to feed the saws in their sawing operation.

The ratchet wheel 32 is formed with a bearing hub upon its opposite side upon which is pivotally mounted a pendulum arm 34 which is secured in position thereon by a stud 35; said pendulum arm being free to swing independent of the ratchet wheel and is provided with a pivoted gravity dog 36 coöperating with the ratchet wheel in such a manner that when the arm is swung upon its pivot, the ratchet wheel will be rotated in the direction of the arrow and through the medium of the pinion 33 carried thereby, the driving gear 13 will be rotated in the direction of the arrow and the feed screw shafts will be revolved in unison, so as to advance the gang saw frame as the saws eat their way into the stone being cut. In order to prevent the ratchet wheel from being turned backwardly in the swinging movement of the pivoted dog 36 carried by the pendulum arm 34, I provide the banjo arm 22 with a stud pin 38 on which is mounted a pivoted dog 39 coöperating with the ratchet wheel, as clearly shown in Fig. 1.

The tight and loose pulleys are driven by a driving belt 40, as shown in dotted lines in Fig. 1, from any source of power; said belt being shifted from the tight to the loose pulley or vice versa by a belt shipper comprising a slidably mounted shaft 41 which is mounted in bearings formed in upwardly extending arms 42 carried by the hanger arms; said rod being provided with shipper fingers 43 between which the driving belt 40 passes so that when the shaft 41 is shifted in its bearings, the belt will be shifted in order to drive either the tight or loose pulley and this of course shows, that when the belt is on the tight pulley, the counter shaft carrying the drive pinion, will be rotated.

In order to provide means for operating the belt shipper, an operating rod 44 is pivotally mounted on a stud 45 carried by a supporting arm 46 extending from one of the hanger arms; the upper end of said rod 44 being pivotally connected to a lug 47 formed on a sleeve 48 fixed on the slidably mounted rod 41 of the belt shipper, whereby the shipper can be readily operated by the operator standing on the ground adjacent the machine.

One of the diagonal braces of the main frame of the sawing machine, is provided with suitable bearings 50 in which is mounted a crank shaft 51 provided with a pulley 52 over which a counter belt 53 passes, which extends around the sleeve 21 of the loose pulley 20 so that when the loose pulley is being driven by the driving shaft, the crank shaft will be rotated.

The crank shaft 51 is provided with a slotted crank 54 in which is slidably mounted a wrist pin 55 carrying a pitman rod 56; the free end of which carries a bolt 57 which extends through a slot 34' formed in the pendulum arm 34 and the opposite end of said bolt passes through an opening formed in the upper end of a regulating rod 58 which is provided with a flattened portion 59 having openings 59' through which is adapted to extend a pin 60 carried by the bracket 30 in order to hold the rod 58 in its adjusted position in order to regulate the throw of the pendulum arm so as to regulate the feed of the gang saw frame, as it will be seen by adjusting the rod 58 vertically, the movement of the pendulum arm will be shortened and by lowering the same, the same will be lengthened whereby the feed can be easily and quickly regulated.

The operation of a stone sawing machine provided with my improved construction of feed driving mechanism as herein shown and described, is as follows: Supposing that the loose pulley is being driven by the driving belt which in turn drives the feed crank shaft through the medium of the counter belt. As the crank shaft is rotated, the pendulum arm carried by the ratchet wheel, is moved backward and forward through the medium of the pitman rod and its connection therewith, and through the medium of the pivoted pawl 36, the ratchet wheel is rotated intermittently and the pinion 33 carried thereby being in mesh as shown in Fig. 3 with the driving gear 13, the driving shaft 12 is rotated and with it, the feed screw shafts so as to lower the gang saw frame in order to feed the saws to the stone as the cuts are made therein. If the driving mechanism was in the position shown in Fig. 4 with the driving belt shifted upon the tight pulley 19, the counter-shaft is rotated carrying with it, the drive pinion 26 which is in mesh with the pinion 23' and as the banjo arm has been rocked upon its pivot so as to throw the pinion 23' into mesh with the driving gear 13, the driving shaft will be rotated in such a manner that the feed screw shafts will be rotated at a high rate of speed in order to advance the gang saw frame quickly in position to be operated upon a stone arranged upon the platen not shown in the sawing machine, it of course being understood that this operation occurs only at the initial sawing of the stone in order to advance the gang saws quickly in position to operate upon a stone. If the banjo arm was shifted so as to throw the pinion 25' into mesh with the driving gear 13 through the medium of the idle gear, the pinion 25 will be reversed so as to cause the driving shaft 13 to be rotated in a reverse direction, whereby the gang saw frame can be quickly wound up after the complete cut has been made, and it will be seen that by the shifting of the banjo arm or by raising and lowering the same, the feed pinion 33 is thrown out of mesh with the driving gear 13 and as the driving belt has been shifted to the tight pulley, the feed crank shaft is stationary and therefore, the feeding mechanism is out of operation. By this construction, it will be seen that I have provided novel means for throwing the feed mechanism out of operation when either the wind-up or lowering pinions are in mesh with the driving gear, thereby making it impossible to throw in either of the wind-up pinions when the feed pinion is in mesh with the driving gear.

While I have shown and described the particular construction of belt shipper, it is of course understood that various other forms of belt shippers can be employed without departing from the spirit of my invention; the main advantage to be obtained in a driving mechanism of this character, being to provide means for changing the speed of the feed of the saws which is manipulated by an operator standing on the ground through the medium of a lever, whereby the feed of the saws can be regulated in accordance with the hardness of the stone being sawed as when a hard spot is struck, the feed can be quickly changed.

I claim:

1. In a machine of the kind described, the combination with feed mechanism, of a driving shaft for said feed mechanism, a gear carried by said driving shaft, a pivotally mounted arm, a series of pinions carried by said arm, means for rotating one of said pinions intermittently, means for continuously rotating the other pinions, and means for adjusting said pivotally mounted arm.

2. In a machine, the combination with a movable frame, of feed mechanism for said movable frame, a driving shaft for said feed mechanism, a gear carried by said driving shaft, a series of driving pinions mounted to independently engage said driving gear, a counter shaft, means for driving one of said pinions intermittently from said counter shaft, means for driving two of the pinions of said series continuously in a reverse direction from said counter shaft, and means for holding any one of said pinions in engagement with said driving gear.

3. In a machine of the kind described, the combination with a pivotally mounted member, feed mechanism for said member, a driving shaft for said feed mechanism, a gear carried by said driving shaft, a pivotally mounted arm, spaced pinions carried by said arm, a driving pinion having a driving connection with two of said pinions, a feed pinion mounted upon said arm, means for driving said feed pinion intermittently, and means for driving said other pinions continuously.

4. The combination with a machine having a movable member, of feed mechanism for said member, a driving shaft for said feed mechanism, a driving gear carried by said driving shaft, a pivotally mounted banjo arm, pinions carried by said arm adapted to independently engage said driving gear, means for rotating one of said pinions intermittently, and means for rotating the other pinions continuously.

5. In a machine, the combination with the feed mechanism thereof, a gear for driving said feed mechanism, of driving means for said driving gear comprising a series of pinions capable of independently engaging said gear, means for driving one of said pinions intermittently, and means for driving the other pinions of said series continuously.

6. In a machine, the combination with the feed driving shaft, of a gear fixed on said shaft, a counter shaft, tight and loose pulleys mounted upon said counter shaft, a gear carried by said counter shaft, an arm pivotally mounted on said counter shaft, a forward drive pinion having a driving connection with said driving pinion, a reverse pinion connected with said loose pulley having a driving connection with said driving pinion, and means for rocking said arm so as to throw either of said pinions into engagement with said driving gear.

7. In a machine, the combination with the feed driving shaft, of a gear fixed on said shaft, a counter shaft, a banjo arm pivotally mounted on said counter shaft, a driving pinion fixed on said counter shaft, pinions having a driving connection with said driving pinion, an intermittently driven pinion carried by said banjo arm, and means for rocking said arm so as to throw said pinions into engagement with said driving gear independently.

8. In a machine, the combination with the feed driving shaft thereof, of a gear fixed on said driving shaft, a counter shaft, tight and loose pulleys mounted on said counter shaft, a driving belt for said pulleys, and mechanisms for driving said driving gear from either the counter shaft or loose pulley thereof.

9. In a machine, the combination with a feed driving shaft, of a gear fixed on said shaft, an intermittently rotated feed pinion for driving said driving gear, and continuously rotating pinions for driving said driving gear, said pinions being carried by a pivotally mounted arm for independently engaging said driving gear.

10. In a machine, the combination with the feed driving shaft having a driving gear, of means for driving said gear intermittently, means for driving said gear continuously in either direction, said driving means being carried by a pivotally mounted arm, and means for adjusting the position of said arm in respect to said driving gear.

11. In a machine, the combination with a movable member, of feed mechanism for said member, a driving shaft for said feed mechanism, a driving gear carried by said driving shaft, a counter shaft, tight and loose pulleys mounted upon said counter shaft, a driving belt for said pulleys, a banjo arm pivotally mounted upon said counter shaft, a driving pinion carried by said counter shaft, pinions carried by said banjo arm having a driving connection with said driving pinion, an intermittently driven pinion carried by said banjo arm, and means for adjusting the position of said banjo arm for driving said driving gear intermittently or in either direction continuously.

12. In a machine, the combination with movable members, of feed shafts for said members, a drive shaft for said feed shafts, a driving gear carried by said drive shaft, a counter shaft, a revoluble member carried by said counter shaft, mechanism driven from said revoluble member for intermittently driving said driving gear, and mechanism driven by said counter shaft for continuously driving said driving gear.

13. In a machine, the combination with the feed mechanism thereof, of a driving shaft for said mechanism, a driving gear carried by said driving shaft, a counter shaft, a banjo arm pivotally mounted upon said counter shaft, a drive pinion carried by said counter shaft, pinions carried by said banjo arm having a driving connection with said drive pinion, a ratchet wheel mounted upon said banjo arm, a feed pinion carried by said ratchet wheel, mechanism for intermittently operating said ratchet wheel from said counter shaft, means for driving said counter shaft continuously, and means for adjusting said banjo arm so as to throw into mesh, any one of said pinions, with said driving gear.

14. In a machine, the combination with the feed shafts thereof, of a driving shaft for said feed shafts, a driving gear carried by said driving shaft, a counter shaft having a tight and loose pulley mounted thereon, mechanism for driving said driving gear from said loose pulley intermittently, and mechanism for driving said driving gear from said counter shaft continuously.

15. In a machine, the combination with the feed shafts thereof, of a driving shaft for said feed shafts, a driving gear carried by said driving shaft, a counter shaft, a banjo arm pivotally mounted upon said counter shaft, a drive pinion carried by said driving shaft, forward and reverse pinions carried by said banjo arm having a driving connection with said drive pinion, a feed pinion carried by said banjo arm, said feed and forward and reverse pinions being mounted to independently engage said driving gear.

16. In a machine, the combination with the feed shafts thereof of a driving shaft for said feed shafts, a driving gear carried by said driving shaft, a counter shaft, tight and loose pulleys mounted upon said counter shaft, a driving belt for said pulleys, a banjo arm mounted upon said counter shaft, a driving pinion fixed on said counter shaft, forward and reverse pinions mounted upon said banjo arm having a driving connection with said drive pinion, a feed pinion carried by said banjo arm, mechanism for driving said feed pinion intermittently from said loose pulley, and means for swinging said banjo arm upon said counter shaft so as to throw said pinions into engagement with said driving gear independently.

17. In a machine, the combination with the feed driving shaft thereof having a driving gear, of forward and reverse pinions capable of independently engaging said driving gear, means for driving said forward and reverse pinions continuously, and an intermittently driven feed pinion mounted to engage said driving gear when the forward and reverse pinions are out of mesh therewith.

18. In a machine, the combination with the feed driving shaft, of a gear carried by said shaft, mechanism for driving said gear intermittently, mechanism for driving said gear continuously in either direction, said driving mechanisms being arranged to independently engage said driving gear, and means for holding said driving mechanisms in adjusted position.

19. In a machine, the combination with a feed driving gear, of a banjo arm, a feed pinion carried by said banjo arm, forward and reverse pinions carried by said banjo arm, mechanism for driving the feed pinion intermittently, means for driving the forward and reverse pinions continuously, and means for adjusting the position of said banjo arm so as to independently throw into mesh any one of said pinions with said driving gear.

20. In a machine, the combination with the feed driving gear thereof, of a counter shaft having tight and loose pulleys mounted thereon, a driving belt for said pulleys, means for shifting said driving belt upon said pulleys, an intermittent feed mechanism for said driving gear driven by said loose pulley, and a continuous feed mechanism for said driving gear driven by said counter shaft.

21. In a machine, the combination with the feed driving gear, of a counter shaft, a pivotally mounted banjo arm mounted upon said counter shaft, a drive pinion fixed on said counter shaft, forward and reverse pinions carried by said banjo arm driven by said driven pinion, a feed pinion arranged between said forward and reverse pinion on said banjo arm, mechanism for driving the feed pinion intermittently, and means for driving the driven pinion continuously, said pinions being arranged upon said banjo arm to engage said driving gear independently.

22. In a machine, the combination with the feed driving gear thereof, of a pivotally mounted banjo arm, a feed pinion carried by said arm, forward and reverse pinions carried by said arm, means for driving said forward and reverse pinions continuously, means for driving said feed pinion intermittently, said pinions being arranged to engage said driving gear independently.

23. In a machine, the combination with the feed driving gear thereof, of a counter shaft having tight and loose pulleys thereon, a pivotally mounted banjo arm, forward and reverse pinions carried by said arm, a driving connection from said counter shaft to said forward and reverse pinions, a feed pinion, and driving mechanism for said feed pinion driven by said loose pulley.

24. In a machine, the combination with the feed driving gear, of a counter shaft having tight and loose pulleys thereon, a driving belt for said pulleys, a belt shipper for said belt, means for driving said driving gear intermittently from said loose pulley, and means for driving said driving gear continuously in either direction from said counter shaft, said driving means being arranged to engage said driving gear independently.

25. In a machine, the combination with the feed driving gear thereof, of a counter shaft having tight and loose pulleys, a pivotally mounted banjo arm, a feed pinion carried by said arm, forward and reverse pinions carried by said arm, mechanism for driving said feed pinion from said loose pulley, mechanism for driving said forward and reverse pinions from said counter shaft, a driving belt for said tight and loose pulleys, and a shipper for said belt.

26. In a machine, the combination with the feed driving gear thereof, of intermittent and continuously driven pinions arranged to independently engage said driving gear, and means for shifting said gears so as to drive said driving gear by any one of said pinions independently.

27. In a machine of the kind described, the combination with the feed driving gear thereof, of a pivotally mounted banjo arm, a feed pinion capable of engaging said driving gear, pawl and ratchet mechanism for driving said feed pinion intermittently, forward and reverse pinions carried by said banjo arm, a counter shaft, a driven pinion carried by said counter shaft having a driving connection with said forward and reverse pinions, tight and loose pulleys mounted upon said counter shaft, a driving belt for said tight and loose pulleys, driving mechanism from said loose pulley to said pawl and ratchet mechanism, and a shipper for said driving belt.

In testimony whereof I affix my signature in presence of two witnesses.

FRANK PIERCE.

Witnesses:
PERCY W. ADAMS,
R. H. DAVIS.

Copies of this patent may be obtained for five cents each, by addressing the "Commissioner of Patents, Washington, D. C."